(12) United States Patent
Hospach et al.

(10) Patent No.: US 10,096,824 B2
(45) Date of Patent: Oct. 9, 2018

(54) ELECTROCHEMICAL STORAGE MATERIAL AND ELECTROCHEMICAL STORAGE DEVICE FOR STORING ELECTRICAL ENERGY, COMPRISING SUCH A STORAGE MATERIAL

(71) Applicant: FORSCHUNGSZENTRUM JUELICH GMBH, Juelich (DE)

(72) Inventors: Andreas Hospach, bad Aibling (DE); Norbert H. Menzler, Juelich (DE); Martin Bram, Juelich (DE); Hans Peter Buchkremer, Heinsberg-Schafhausen (DE); Leszek Niewolak, Juelich (DE); Willem J. Quadakkers, EG Wijnandsrade (DE); Joanna Zurek, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 250 days.

(21) Appl. No.: 14/889,040

(22) PCT Filed: May 2, 2014

(86) PCT No.: PCT/DE2014/000232
§ 371 (c)(1),
(2) Date: Nov. 4, 2015

(87) PCT Pub. No.: WO2014/187440
PCT Pub. Date: Nov. 27, 2014

(65) Prior Publication Data
US 2016/0087269 A1 Mar. 24, 2016

(30) Foreign Application Priority Data

May 18, 2013 (DE) .................. 10 2013 008 659

(51) Int. Cl.
| | |
|---|---|
| H01M 4/38 | (2006.01) |
| H01M 12/08 | (2006.01) |
| H01M 4/48 | (2010.01) |
| H01M 4/485 | (2010.01) |
| H01M 4/50 | (2010.01) |
| H01M 4/52 | (2010.01) |

(52) U.S. Cl.
CPC ............. *H01M 4/38* (2013.01); *H01M 4/48* (2013.01); *H01M 4/485* (2013.01); *H01M 4/50* (2013.01); *H01M 4/52* (2013.01); *H01M 12/08* (2013.01); *H01M 2220/10* (2013.01); *Y02E 60/128* (2013.01)

(58) Field of Classification Search
CPC .......... H01M 4/38; H01M 4/48; H01M 4/485; H01M 4/50; H01M 4/52; H01M 12/08; H01M 2220/10
See application file for complete search history.

(56) References Cited

U.S. PATENT DOCUMENTS

| | | | |
|---|---|---|---|
| 7,582,386 B2* | 9/2009 | Takami | H01M 2/1077 429/218.1 |
| 2009/0117384 A1* | 5/2009 | Han | A61K 8/29 428/402 |
| 2011/0033769 A1 | 2/2011 | Huang et al. | |
| 2012/0034520 A1 | 2/2012 | Lu et al. | |
| 2014/0342217 A1 | 11/2014 | Benkert et al. | |

FOREIGN PATENT DOCUMENTS

| | | |
|---|---|---|
| DE | 695 32 204 | 9/2004 |
| DE | 10 2010 041 019 | 3/2012 |
| DE | 10 2011 083 410 | 3/2013 |
| JP | 2013-502039 A | 1/2013 |
| JP | 2013-025933 A | 2/2013 |
| WO | WO-95/34918 | 12/1995 |
| WO | WO-2012/146465 | 11/2012 |
| WO | 2013/045217 A1 | 4/2013 |
| WO | WO-2013/045208 | 4/2013 |
| WO | WO-2013/045223 | 4/2013 |

OTHER PUBLICATIONS

Chen, K-J; Hung, F-Y; Lui, T-S; Xiao, R-S—Improvement of Charge-Discharge Characteristics of the Mg—Ni Powder Electrodes at 55oC, Hindawi Publishing Corporation, Journal of Nanomaterials, vol. 2013 (Year: 2013).*

Xuan Zhao et al: "Performance of Solid Oxide Iron-Air Battery Operated at 550C", Journal of the Electrochemical Society, vol. 160, No. 8, Mar. 25, 2013 (Mar. 25, 2013), pp. A1241-A1247, XP055065462, DOI: 10.1149/2.085308jesj p. 1243, col. 2, paragraph 3.

* cited by examiner

*Primary Examiner* — Anca Eoff
(74) *Attorney, Agent, or Firm* — Norris McLaughlin & Marcus, P.A.

(57) ABSTRACT

Storage material, for storing electrical energy by reduction or oxidation of an active component, comprises the active component in at least a reduced and/or oxidized form and a reactive framework structure that is capable of chemically integrating at least one form of the active component in the form of a mixed oxide or an alloy into the reactive framework structure during the charging or discharging process. In the case of an oxidic framework structure, said integration can occur by formation of at least one stable mixed oxide of the active component and an oxide from the framework structure. In the case of the metallic framework structure, said integration can occur by forming an alloy of active component and at least one metal of the framework structure.

18 Claims, 12 Drawing Sheets

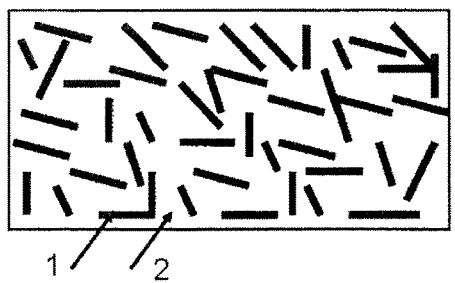
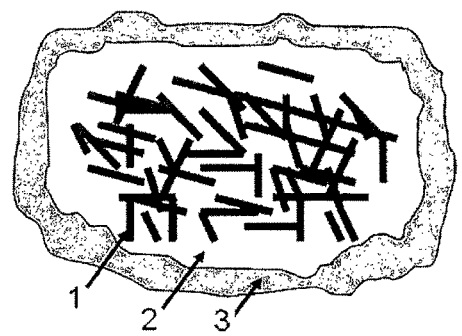
FIG. 2a                    FIG. 2b

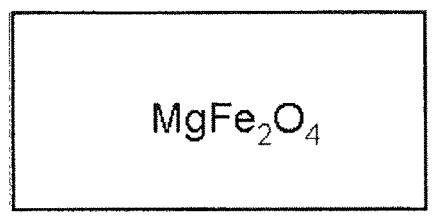 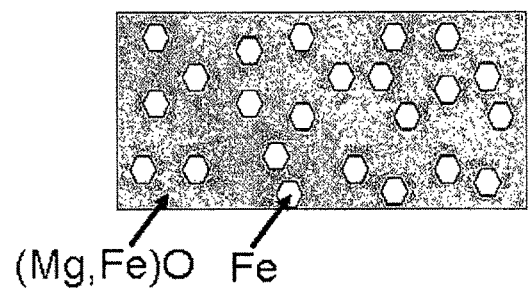
FIG. 6a                     FIG. 6b

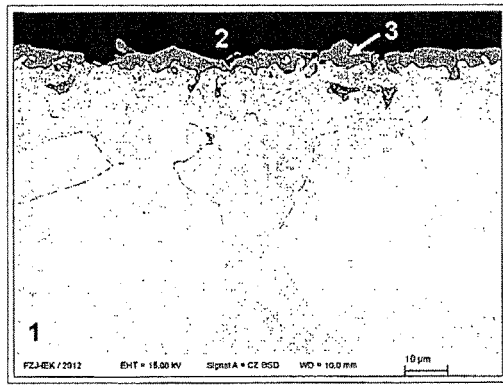 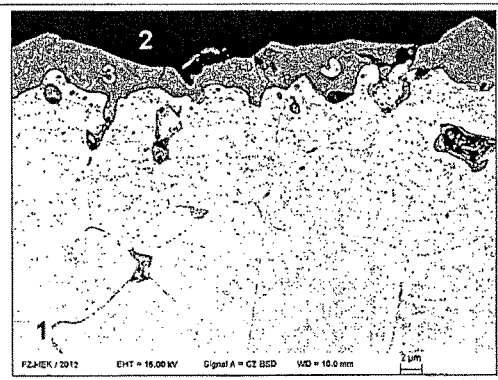
FIG. 11a                    FIG. 11b

ELECTROCHEMICAL STORAGE MATERIAL AND ELECTROCHEMICAL STORAGE DEVICE FOR STORING ELECTRICAL ENERGY, COMPRISING SUCH A STORAGE MATERIAL

The invention relates to a storage material for a storage device, which has long-term stability at temperatures between 500 and 1000° C., in particular between 600 and 900° C., and at an oxygen partial pressure between $10^{-4}$ and $10^{-30}$ bar, in particular between $10^{-12}$ and $10^{-22}$ bar, and which can take up electrical energy in the form of oxygen and release electrical energy again, in the largest possible quantity and/or as quickly as possible.

The invention further relates to a device for storing (charging) and providing (discharging) electrical energy comprising the aforementioned material, and to a method for producing such a material.

BACKGROUND OF THE INVENTION

Many modern applications, of both the stationary and mobile type, are operated by an electrical current. If a permanent current source in the form of the electricity supply grid or a generator is not available, energy stores for storing electrical energy must be utilized to operate these devices. Particularly effective in this regard are rechargeable stores for electrical energy having an electrochemical basis, i.e. the type that can both store electrical energy and release electrical energy again as necessary. Such a store is therefore an embodiment of a galvanic cell, and is also referred to as a rechargeable battery or an accumulator. The so-called high-temperature metal/metal oxide storage device is a particular type of an electrochemical energy storage device.

Such a high-temperature metal/metal oxide storage device consists of at least one module having two electrodes and, disposed therebetween, an oxygen-conducting electrolyte, as is schematically illustrated in FIG. 1. The legend characters in FIG. 1 have the following meanings:
1) housing or interconnectors;
2) air chamber, in which an oxygen-rich gas (e.g. air) is located;
3) air electrode;
4) oxygen-ion conducting electrolyte;
5) fuel electrode;
6) fuel chamber, in which the so-called shuttle gas (e.g. $H_2+H_2O$) is located; and
7) electrochemical storage material.

The components, the air electrode (3), the electrolyte (4), and the fuel electrode (5), form the electrochemical cell. The electrochemical cell can be operated in two different operating modes.

During the discharging of the storage device, the electrochemical cell uses the hydrogen present in the fuel chamber and the oxygen present in the air chamber for energy generation, in a manner similar to that of a fuel cell. Water forms in the fuel chamber as a by-product, which reacts with the electrochemical storage material (7). During this reaction, the oxygen from the water is chemically bound in the storage material via oxidation and hydrogen is released. The released hydrogen is further used as fuel for energy generation. The aforementioned reaction continues to run until all the storage material has been converted or oxidized.

During the charging of the storage device, the water present in the combustion chamber of the electrochemical cell is decomposed with the aid of the electric current. The oxygen from the water is transported, in the form of oxygen ions, by the electrolyte of the cell into the air chamber and, there, is released as gas and loses electrons. On the other side, the hydrogen from the water reacts, accepting electrons, to form hydrogen, which migrates into the storage material and, there, effects a reduction of the oxide that is present. The oxygen from the storage material is taken up and water forms as the product of the reduction process, which migrates back into the fuel chamber.

The $H_2/H_2O$ gas mixture in the fuel chamber therefore functions as an oxygen transfer agent (shuttle) and allows oxygen transport between the cell and the storage material. It is also possible to use a mixture of $CO/CO_2$ as the shuttle gas, instead of $H_2/H_2O$.

A few materials for the electrochemical storage of energy in the form of oxygen are already known from the literature, in particular so-called metal/metal oxide materials are used as energy stores for this purpose. Manganese, iron or nickel, or their alloys, for example, are mentioned as storage materials, which are present in reduced form as metal, and in oxidized form as metal oxides.

With these storage materials, excess electrical energy (such as from wind or solar energy) can be used to reduce the metal oxide (e.g. $Fe_2O_3/Fe_3O_4/FeO$ or NiO). The storage device is thereby charged. The reduced storage material can be oxidized as necessary, whereby electrical energy is released again. The store is discharged.

It has been shown, however, that these metal/metal oxide materials (e.g. iron/iron oxide, manganese/manganese oxide or nickel/nickel oxide), which are known as storage materials, do not have adequate long-term stability in the form that has been available to date. This means that, after a large number of discharging and charging cycles, the storage material loses its capability to take up and release energy, or this capability is greatly diminished (degradation). It has been shown that this is due to the insufficient material stability.

In the case of oxide-based storage materials, the discharging and charging cycles in the case of the known metal/metal oxide materials regularly result in separation and coarsening of the storage material. As a result of the two aforementioned processes, a layer consisting of a reactive oxide forms on the surface of the storage material. During the reduction process (battery charging), the oxide layer gradually transforms into a gas-tight metal layer. The formation of such a gas-tight metal layer, however, disadvantageously diminishes or prevents the gas exchange by the storage material with the atmosphere, and thereby prevents further charging processes. The three processes—separation, coarsening, and formation of the gas-tight metallic surface layer—are responsible for the tendency for conventional storage materials to gradually lose effectiveness.

The aforementioned processes are the reason for the disadvantageous agglomeration, which, in turn, results in a reduced active surface (see FIG. 2). In the schematic illustration of the storage material in FIG. 2, the reference characters mean: 1=inert oxide; 2=reactive oxide; 3=surface cover layer consisting of oxide or metal. The starting state of the storage material is shown on the left side (FIG. 2a), in which the inert oxide is present so as to be virtually evenly distributed in the reactive oxide. The state after multiple charging and discharging cycles is shown on the right side (FIG. 2b). The inert oxide has agglomerated and a cover layer consisting of oxide and metal has formed on the surface, which prevents the further charging and discharging cycles.

Attempts were made in the past to prevent this reaction of known metal/metal oxide materials, which was perceived to be disadvantageous. To this end, attempts were made, for example, to prevent agglomeration or coarsening of the material using different additions of chemically inert oxides. Zirconium dioxide doped with yttrium, as the chemically inert oxide, for example, was used as the ionic conductor or the support matrix. Oxides such as cerium oxide or titanium dioxide were used in small quantities as the ceramic strengthening phase for material formation, and were intended to result in so-called ODS (oxide dispersion strengthened) materials. It was shown that agglomeration or coarsening of the material could be slowed, due to longer diffusion paths, but not prevented, at the expense of the energy density.

The basic mode of operation of a storage device for storing or releasing chemically stored electrical energy is on the basis of two different examples of the known metal/metal oxide (Me/MeO$_x$) store, in particular a Fe/(Mg,Fe)O store, which is operated with oxygen, i.e. for example with an H$_2$O/H$_2$ or CO$_2$/CO gas mixture.

FIGS. 3a and 3b each show, at different scales, the microstructure of the storage material Fe/(Mg,Fe)O with an inert oxide (ZrO$_2$) after 10 cycles, wherein the last cycle was a charging cycle.

By comparison, FIGS. 4a and 4b each show, also at different scales, the microstructure of the same storage material with the same inert oxide after 11 cycles, in this case the last cycle being a discharging cycle.

In FIGS. 3 and 4, the reference characters mean: 1=storage material, 2=embedding mass (black), auxiliary material for the preparation of the polished specimens, i.e. not present in the battery operation, 3=oxide or metal layer (light gray), 4=inert oxide (dark gray), and 5=Fe oxide, or Fe.

In the case of storage materials based on a metal alloy, an effect also occurs wherein a closed metal layer disadvantageous forms during the charging cycle, which prevents charging processes, after a relatively short time (see FIG. 5).

In FIG. 5, the reference characters mean: 1=storage material (metal), 2=embedding mass (black), 3=oxide layer, and 4=closed metal layer.

Furthermore, an increase in the porosity, due to the addition of pore-forming material such as polymers, graphite, or starch, was investigated, which was likewise capable of delaying, but not preventing, the agglomeration/coarsening and the formation of the outer layer.

The formation of chemically stable mixed oxides, such as chromite spinels, also did not achieve the objective in terms of avoiding structure coarsening while simultaneously retaining reversibility. The reason for this, inter alia, is that the thermodynamically formed mixed oxides in the selected reduction-oxygen partial pressure range are no longer reducible or the reduction kinetics are greatly slowed.

SUMMARY OF THE INVENTION

The object of the invention is to provide a high-temperature storage device, which has long-term stability at temperatures between 500 and 1000° C., in particular between 800 and 800° C., and at an oxygen partial pressure between $10^{-4}$ and $10^{-30}$ bar, in particular between $10^{-12}$ and $10^{-22}$ bar, and which can take up electrical energy in the form of chemically bound oxygen and release electrical energy again, in the largest possible quantity and/or as quickly as possible. "In the largest possible quantity" means that, optimally, ail of the storage material contributes to the energy storage, in this context, "as quickly as possible" means a few minutes to a few hours.

Furthermore, the object of the invention is to provide a suitable material as the electrochemical storage material for the aforementioned high-temperature storage device, which has long-term stability and also shows very little storage loss after a large number (more than 1000) of discharging and charging cycles.

"Long-term stability" is understood to mean the retention of specific physical and chemical properties, such as microstructure (shape, size, and grain distribution of phases and pores), the capability or the kinetics of the oxygen release and uptake and the like. Within the scope of this invention, a storage material having a storage loss of less than 10% after more than 10,000 redox cycles is considered to have long-term stability.

The objects of the invention are achieved by a storage material according to the main claim and by a storage device comprising the storage material according to the alternative independent claim. Advantageous embodiments of the storage material and the storage device are found again in the respective dependent claims.

Within the scope of the invention, it has been shown that a coarsening or permanent separation of the storage material, as is schematically illustrated in FIG. 2, can be prevented in that the active component of the storage material can be taken up, completely or to a large extent, in a reactive framework structure of the storage material during the charging or discharging process. The reactive framework structure and the active component comprising this are referred to collectively in the following as the storage material according to the invention.

The storage material according to the invention for a high-temperature storage device therefore comprises, in addition to an active component, a reactive framework structure, which is capable of taking up at least one form of the active component, i.e. in the oxidized or reduced form thereof.

Within the scope of this invention, an active component is understood to be a redox couple, i.e. a material, which can be present in an oxidizable and a reducible form, and which can take up electrical energy in the form of oxygen and release electrical energy again, in the largest possible quantity and/or as quickly as possible.

The redox couple also can comprise, in addition to a metal and a metal oxide, other metal oxides, for example, having different levels of oxidation or a non-metallic oxidation starting material. The active material in form of this redox couple is also referred to in the following simply as (Me/MeO$_x$). The reactions of the redox couple are:

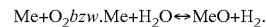

Me+O$_2$bzw.Me+H$_2$O↔MeO+H$_2$.

The oxidizable and reducible material (redox couple) is preferably present in the form of a metal or a metal oxide. The active component comprises, in particular, iron, copper, manganese, cobalt, nickel, tin, molybdenum, or tungsten, or an alloy of these materials. Antimony can also be used as active material, although only with limitations, i.e. at temperatures below 600° C., for example, due to the low melting temperature thereof.

Within the framework of the invention, a reactive framework structure is understood to be a matrix having the largest specific surface area possible, which comprises at least one oxide or a metal as the framework structure, and is referred to in the following as the oxidic or metallic framework structure. In contrast to the matrices known so far, the storage material according to the invention now has a reactive framework structure. Reactive is understood to be a property of the framework structure wherein at least one form of the active component, which is present in reduced or oxidized form, can be integrated by dissolution or chemically integrated into the framework.

This integration can occur in the case of an oxidic framework structure, in particular, in the formation of at least one stable mixed oxide consisting of the active component and an oxide from the framework structure. In the case of the metallic framework structure, the integration occurs by the formation an alloy of active components and at least one metal of the framework structure.

This integration distinguishes the storage material according to the invention from those known to date, in which the active component is present either only adsorptively bound to a matrix, which itself is chemically inert with respect to the active component, or in which a chemically inert oxide is added to the active component, such as, for example, zirconium dioxide stabilized with yttrium, YSZ, or by addition of small quantities of oxides, such as, for example, cerium oxide or titanium dioxide, whereby an ODS material having an active component is generated. However, certain oxidic matrices can also disadvantageously result in mixed oxide formation with the active component, which is so strong that sufficient reversibility is no longer achieved for the mode of operation of the active component. This is the case with a chromite spinel, for example.

By comparison, the storage material according to the invention has a reactive framework structure, which can consist either of a reactive framework oxide or a reactive framework metal (alloy).

In this context, the term "reactive" means that the material of the framework not only functions as an inert support material, which comprises only the active component, but rather the framework material actively reacts either with an oxidized form of the active component (e.g. a metal oxide) or with a reduced form of the active component (e.g. a metal). This means that, during the charging or discharging process, the reactive framework material dissolves a reaction product (metal or oxide) into itself and/or enters into a chemical compound therewith.

The principle of the storage material according to the invention is initially schematically illustrated in the following with reference to FIGS. 6 and 9. FIGS. 6a and 6b show an embodiment of the storage material according to the invention having an oxidic framework material, while the embodiment having a metallic framework material is illustrated in FIGS. 9a and 9b. The active component (Fe in this case) is shown in the reduced form (charged state) thereof on the left sides (a) in each case, while this is present in the oxidized form thereof as oxide (discharged state) on the right side (b) in each case.

In the case of the oxidic framework material (FIG. 6), the active component is integrated, in the oxidized form thereof, as a mixed oxide into the reactive framework structure, whereas, in the case of the metallic framework material, the reduced form of the active component, the metal, is integrated as an alloy into the reactive framework structure.

According to the invention, the framework structures are present in the reactive state under the specified operating conditions (temperature and oxygen partial pressure), and therefore the framework can take up the active component either in the form of an alloy during charging of the storage device (reducing conditions) or in the form of a mixed oxide during discharging of the storage device.

The different materials of the framework structure do not usually have this "reactivity" in every case, however, but rather often only under defined operating conditions. This means that, either framework materials that are suitable for the storage or discharging are selected depending on the specified operating conditions (temperature and $O_2$ partial pressure), or operating conditions that are suitable depending on the framework material should be selected or set in order to effectively permanently prevent, according to the invention, the effect of material coarsening or separation of the storage material.

Operating temperatures of between 500 and 1000° C. and oxygen partial pressures of between less than $10^{-30}$ and more than $10^{-10}$, and up to $10^{-1}$ in exceptional cases, have proven to be advantageous to date. The storage materials according to the invention are therefore preferably suitable for a high-temperature storage device.

By means of the storage material according to the invention, or by means of an electrochemical storage device comprising this material, excess electrical energy can be advantageously stored and used again at a later point in time and, due to the long-term stability thereof, this is also possible for a very large number of charging and discharging cycles, in particular for more than 10,000 cycles, without the storage capacity being significantly degraded.

The porosity of the storage material can be influenced within certain limits by the manner in which the starting materials are produced. Advantageous open porosities are in the range between 5 and 50% by volume. High porosity allows rapid gas exchange and, therefore, allows very short charging and discharging times for the storage device. This usually occurs at the expense of the energy density, which is based on a certain volume. Depending on whether the requirements for the storage device are high dynamics or high energy density, a person skilled in the art can select a corresponding porosity in order to thereby advantageously adjust the storage device to the performance profile.

In the method for operating such a storage device according to the invention, oxygen is usually used as the preferred and well-suited oxidant in the air chamber of the storage device, not least because of the availability and generally recognized safety thereof. In particular, the use of ambient air as the oxidant is suitable for this.

For the production of the storage material according to the invention, any type of starting material, such as oxides, hydroxides, carbonates, oxalates, etc., can be used, which subsequently form the active component (redox couple) and the material of the framework structure during the production process. The starting materials are then mixed in the stoichiometric ratio required for the formation of the mixed oxides and/or the oxidic mixed crystals, homogenized, provided with additives as necessary, such as binding agents (such as latex emulsions, polyvinyl alcohol, ethyl cellulose, polyvinyl butyral, polyvinylpyrrolidone, polyacrylic ester), plasticizers (such as softening agents based on phalate or polyethylene glycol, waxes) and pore-forming materials (such as starch, graphite, polymers), and may be shaped. Typical standard processes such as, for example, extrusion, pressing, tape casting, and others, can be used in production.

The mixing ratio that is to be set is dependent on the reactive mixed oxides that form. If the object is to integrate another support component in addition to the active component, the support portion should be small enough that it does not make up the main mass, or the main volume, of the store, and must be large enough to allow percolation. If too much active component (e.g. Fe) is added, for example, the mixed oxide or the mixed crystal cannot bind/integrate all of the Fe, which, in turn, results in the coarsening or reduced storage capacity.

Further features, properties and advantages of the present invention are presented in the following and are explained in greater detail with reference to exemplary embodiments and further figures without the overall invention being limited thereby.

BRIEF DESCRIPTION OF THE DRAWINGS

FIG. 2a shows the starting state of the storage material;

FIG. 2b shows the state after multiple charging and discharging cycles;

FIG. 6a shows an embodiment of the storage material;

FIG. 6b shows an embodiment of the storage material;

FIG. 11a shows the oxidized state (charged state) of the storage material;

FIG. 11b shows on a different scale the oxidized state (charged state) of the storage material;

DESCRIPTION OF THE PREFERRED EMBODIMENTS

Figure 1:
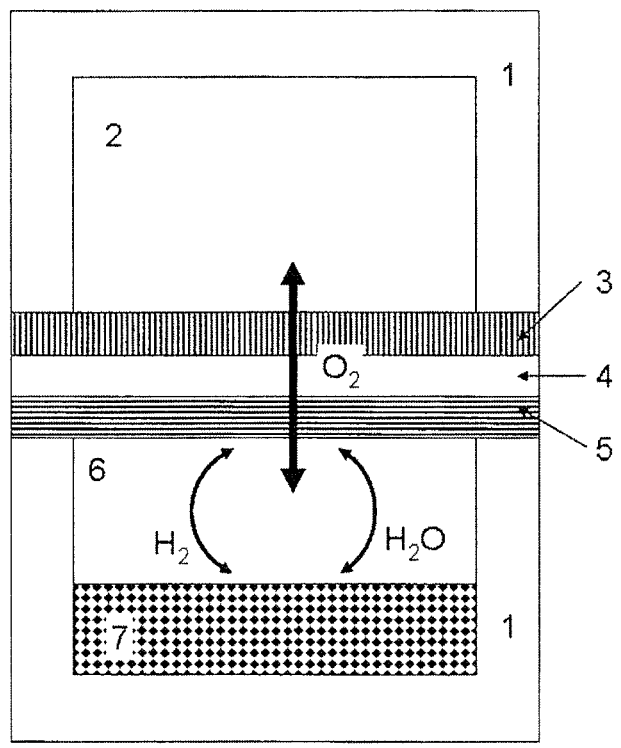
FIG. 1 shows schematically a high-temperature metal/metal oxide storage device consisting of at least one module having two electrodes and, disposed there between, an oxygen-conducting electrolyte.
Figure 3A:
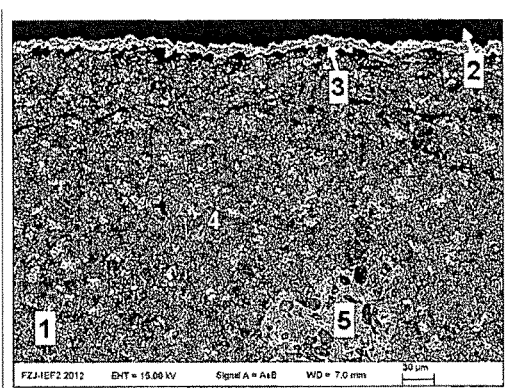
FIG. 3a shows the micro structure of the storage material FE/(Mg,Fe)O with an inert oxide ($ZrO_2$) after 10 cycles.
Figure 3B:
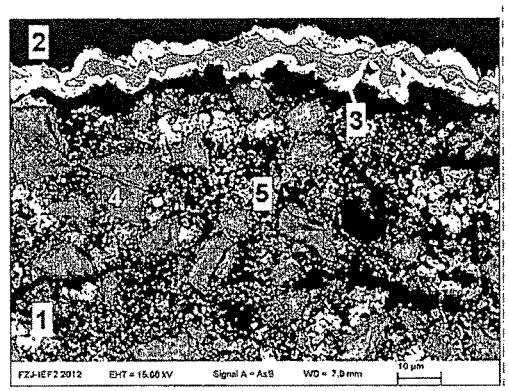
FIG. 3b shows on a different scale the micro structure of the storage material FE/(Mg,Fe)O with an inert oxide ($ZrO_2$) after 10 cycles.
Figure 4A:
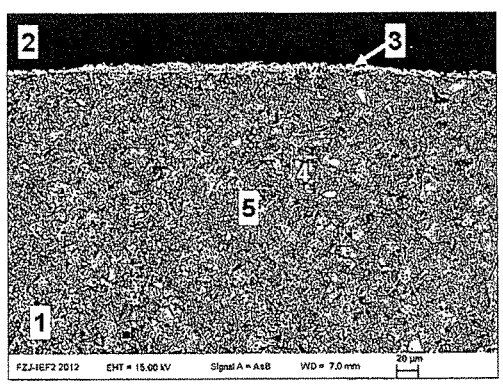
FIG. 4a shows the micro structure of the same storage material with the same inert oxide after 11 cycles.
Figure 4B:
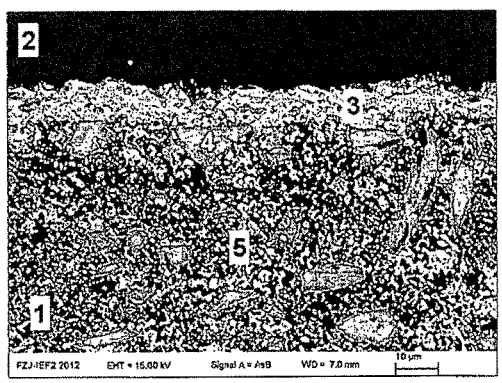
FIG. 4b shows on a different scale the micro structure of the same storage material with the same inert oxide after 11 cycles.
Figure 5:
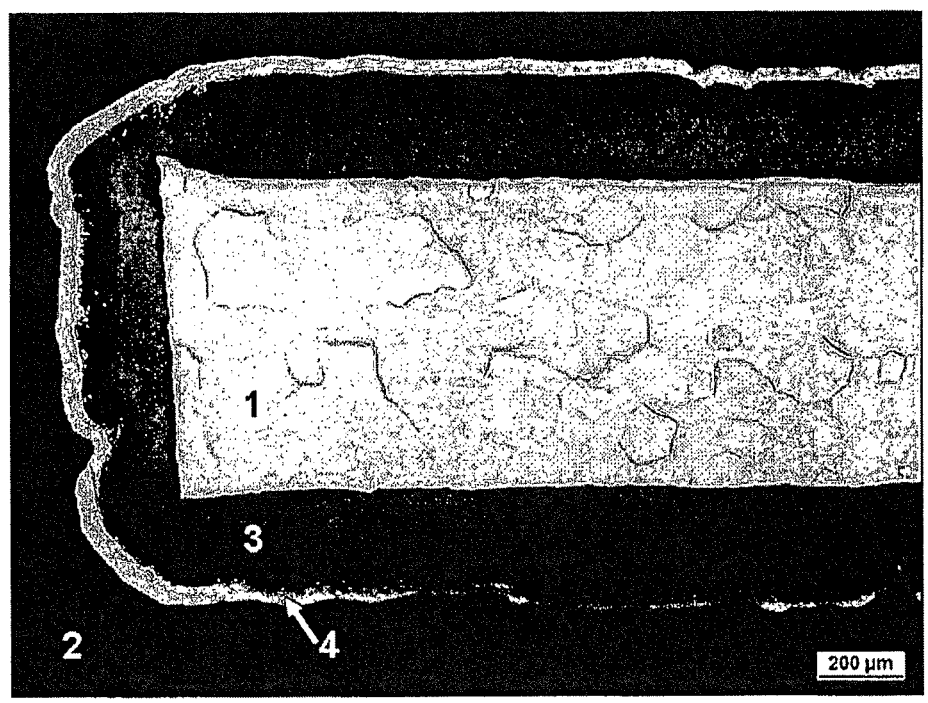
FIG. 5 shows in the case of storage materials based on a metal alloy, an effect also occurs wherein a closed metal layer disadvantageously forms during the charging cycle, which prevents charging processes, after a relatively short time.

Energy stores according to the invention, which are provided with a storage material according to the invention in the form of a metal or a metal oxide as the active component (redox couple), are described within the framework of specific exemplary embodiments. At this point, it is once again noted that the active component does not necessarily need to comprise only one metal and one metal oxide, but rather the redox couple can also comprise, for example, multiple metal oxides having different levels of oxidation or multiple alloys.

A) First Advantageous Embodiment of the Invention Having a Storage Material Composing an Active Component and a Reactive, Oxidic Framework Structure Exemplary Embodiment Active Component: Fe—FeO, Framework Structure-Forming Material: MgO.

For an energy storage material having iron as the active component and magnesium oxide as the framework structure, this means, for example, a mixing ratio of Mg to Fe of 1:2 (based on mole percentage or atomic percentage), or of 1:1 when the oxides MgO and $Fe_2O_3$ are used. At these ratios, a series of mixed oxides $((Fe,Mg)O—MgFe_2O_4)$ would form.

A slight hypostoichiometry of iron, as compared to the pure iron oxide, can advantageous, just as can a slight hyperstoichiometry, and therefore deviations from the specified ratio of ±10% are also intended to be included within the scope of this invention.

In the first case, however, this would come at the expense of the energy density, which is to say, less active component relative to the total mass of the storage device. In the second case of the hyperstoichiometry, in contrast, a migration of the active component over time can no longer be ruled out. In the present case, with iron as the active component and magnesium oxide as the framework structure, it would therefore be advantageous to set an atomic mixing ratio of between 1:1 and 1:3 of Mg to Fe.

The finished storage material therefore comprises $(Fe,Mg)O$ or $(Mg,Fe)_2O_4$ or $MgFe_2O_4$, depending on the desired composition and the production parameters.

Production Routes:

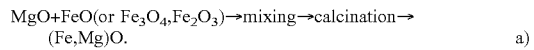

$MgO+FeO(or\ Fe_3O_4,Fe_2O_3) \rightarrow mixing \rightarrow calcination \rightarrow (Fe,Mg)O.$  a)

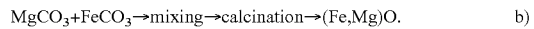

$MgCO_3+FeCO_3 \rightarrow mixing \rightarrow calcination \rightarrow (Fe,Mg)O.$  b)

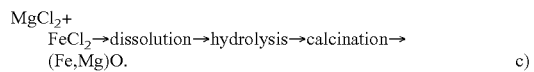

$MgCl_2+FeCl_2 \rightarrow dissolution \rightarrow hydrolysis \rightarrow calcination \rightarrow (Fe,Mg)O.$  c)

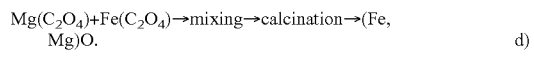

$Mg(C_2O_4)+Fe(C_2O_4) \rightarrow mixing \rightarrow calcination \rightarrow (Fe,Mg)O.$  d)

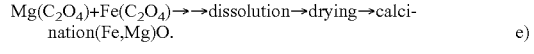

$Mg(C_2O_4)+Fe(C_2O_4) \rightarrow \rightarrow dissolution \rightarrow drying \rightarrow calcination(Fe,Mg)O.$  e)

The storage material according to the invention comprising (Fe,Mg)O can be produced and, provided this is necessary, subsequently packaged using any type of method, as described above. The finished storage material can be made available as oxide powder advantageously having a particle size of less than 10 μm. This corresponds to a mean particle size of 0.2 to 10 μm, and advantageously between 0.5 to 5 μm. Finer powder having a mean particle size of less than 0.2 μm regularly results in lower porosity, while experience has shown that coarser powder having a mean particle size of more than 10 μm results in a lower specific surface area.

The powdery storage material can be subsequently brought into the desired shape (such as foils, rods, granulates, etc.), if necessary, by means of various ceramic processes.

As an alternative, the desired final shape (such as foils, rods, granulates, etc.) can also be produced directly from the starting materials with or without additives (such as binding agents, plasticizers or pore-forming materials), and therefore the finished storage component can be produced in one step, during the calcination process. Powder charges in different shapes are also possible.

The shaping serves to improve handling while retaining a high, open overall porosity in the storage material and can be carried out, for example, by pressing, casting, or extrusion. The advantageous porosity is between 10 and 80% by volume, in particular between 20 and 80% by volume. A metal hydride, for example, can also be used to foam the storage material.

The blanks are subsequently sintered in order to form the desired phase, which is $MgFe_2O_4$ in the present case, and to achieve the necessary dimensional stability or microstructure.

The sintering or the phase formation of the mixed oxides can also take place, as an alternative, during the "warming up" of the entire storage system to the operating temperature. The use of oxides as starting material offers the advantage (in addition to lowering material costs) that sufficient volume and porosity are present in the store in order to withstand, undamaged, the phase transitions during operation and to ensure that gas can flow through to a sufficient extent. Possible powder charges of the storage material are also mentioned here, Second Exemplary Embodiment Active Component: Fe—FeO, Framework Structure-Forming Material: CaO.

In the case of iron as the active storage component, particularly suitable metal/metal oxide materials are mixed oxides of the type $MeFe_2O_4/Me_2Fe_2O_5/MeFe_3O_5$, etc., wherein Me is a bivalent metal ion, and oxidic mixed crystals of the type (Me,Fe)O having a Wüstite crystalline structure are mentioned, as well as reactive mixed oxides of the type $MeFe_2O_4/MeFeO_3$, etc., wherein Me is a tetravalent metal ion. The mixed oxides and oxidic mixed crystals can be reduced in steps, wherein, at the end of the reaction, depending on the selection of the oxidic framework structure, a metallic phase can be formed or only oxidic phases may be present. In the subsequent oxidation, the phase that is formed is integrated into the framework structure again. This effectively prevents material separation/migration in the storage material. An exemplary reaction for Me=Ca at 800° C. is as follows:

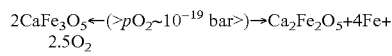
$$2CaFe_3O_5 \leftarrow (>pO_2 \sim 10^{-19} \text{ bar}>) \rightarrow Ca_2Fe_2O_5 + 4Fe + 2.5O_2$$

A Fe:Ca atomic ratio of 3:1 would therefore be ideal for such a storage material. If one would accept minor losses in performance or in the reduction of the service life, the ratio could also be set in the broader range between 5:1 and 1:1.

Depending on the oxygen partial pressure that is present, and depending on the temperature during the charging or discharging operation of the storage material, the following further phase conversions, for example, are of interest:

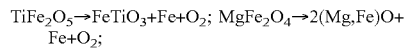
$$TiFe_2O_5 \rightarrow FeTiO_3 + Fe + O_2; MgFe_2O_4 \rightarrow 2(Mg,Fe)O + Fe + O_2;$$

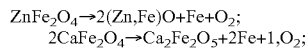
$$ZnFe_2O_4 \rightarrow 2(Zn,Fe)O + Fe + O_2;$$
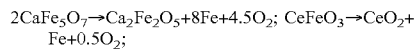
$$2CaFe_2O_4 \rightarrow Ca_2Fe_2O_5 + 2Fe + 1,O_2;$$

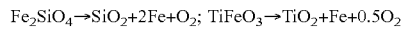
$$2CaFe_5O_7 \rightarrow Ca_2Fe_2O_5 + 8Fe + 4.5O_2; CeFeO_3 \rightarrow CeO_2 + Fe + 0.5O_2;$$

$$Fe_2SiO_4 \rightarrow SiO_2 + 2Fe + O_2; TiFeO_3 \rightarrow TiO_2 + Fe + 0.5O_2$$

In addition to iron as the active component, mixed oxides based on Cu, Mn, Ni, Co, Mo and W are also suitable, provided these form reactive framework structures (under suitable redox conditions), such as $CuFe_2O_4$, $CoFe_2O_4$ or $NiFe_2O_4$. In addition, mixtures of the aforementioned components are also possible.

The aforementioned Table 1 shows a few specific examples of possible variants of storage materials, according to the invention, which have an oxidic framework structure, and the corresponding conditions with regard to the temperature and the oxygen partial pressure at which the framework structure has the "reactive" property thereof (stability ranges).

| Active component | Framework element | Oxygen partial pressure range* [lg($p_{O2}$[bar])] from | to | Temperature range [° C.] | Oxides in addition to FeO |
|---|---|---|---|---|---|
| Fe | Mg | −21 | −17 | 600-1000 | (Mg, Fe)O, (Mg, Fe)$_3$O$_4$ |
| Fe | Ca | −20 | −16 | 600-1000 | CaO, Ca$_2$Fe$_2$O$_5$ CaFe$_3$O$_5$, Fe$_3$O$_4$ [2] |
| Fe | Sr | −21 | −17 | 600-1000 | SrO, (Fe, Sr), Sr$_2$Fe$_2$O$_5$ |
| Fe | Ba | −20 | −17 | 600-1000 | BaO, Ba$_2$Fe$_2$O$_5$ Ba$_3$Fe$_2$O$_6$ |
| Fe | Ti | | | 600-1000 | FeTiO$_3$, Fe$_2$TiO$_5$ |
| Fe | Mn | −20 | −15 | 600-1000 | (Fe, Mn)O (Fe, Mn)$_3$O$_4$ |
| Fe | Cu | −15 | −10 | 600-1000 | CuFe$_2$O$_4$, (Fe. Cu)O |
| Fe | Co | −21 | −17 | 600-1000 | (Co, Fe)O (Co, Fe)$_3$O$_4$ |
| Fe | Ni | −19 | −15 | 600-1000 | (Ni, Fe)O |
| Fe | Zn | | | 600-1000 | ZnO |
| Fe | Ce | −21 | −17 | 600-1000 | CeO$_2$, CeFeO$_3$ |
| Fe | W | −20 | −16 | 500-700 | WO$_3$, WO$_2$ |
| Fe | Mo | −20 | −16 | 500-700 | MoO$_3$, MoO$_2$ |

*The listed oxygen partial pressure ranges are based on an operating temperature for the storage system of approximately 800° C. The values change with different temperatures and can be easily calculated for a different temperature range on the basis of known databases for thermodynamic data of oxidic systems.

Table 2, below, lists the relevant oxygen partial pressure ranges due to the $H_2/H_2O$ equilibrium in the mixing ratios used here (80/20, 20/80) at 800° C. A similar table for the $CO/CO_2$ equilibrium could also be calculated by a person skilled in the art using the FactSage program.

| Ratio $H_2/H_2O$ | lg($p_{O2}$) at 650° C. [bar] | lg($p_{O2}$) at 800° C. [bar] | lg($p_{O2}$) at 900° C. [bar] |
|---|---|---|---|
| 90/10 | −24 | −20.3 | −18.1 |
| 80/20 | −23.5 | −19.5 | −17.5 |
| 50/50 | −22 | −18.5 | −16.2 |
| 20/80 | −21 | −17 | −15 |
| 10/90 | −20.2 | −16.5 | −14.3 |

Figure 7A:
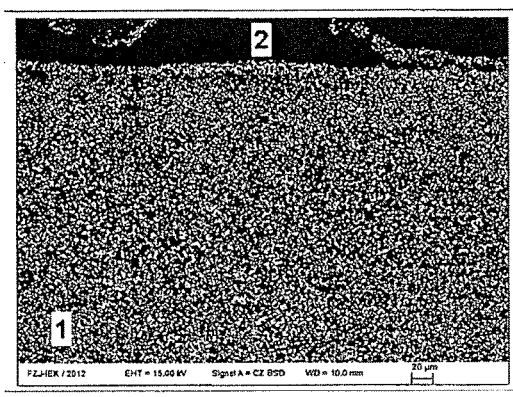
FIG. 7a shows the case of a reactive oxidic framework structure.
Figure 7B:
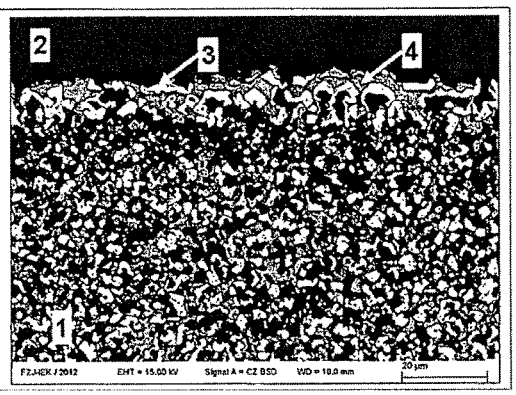
FIG. 7b shows the case of a reactive oxidic framework structure.
Figure 8A:
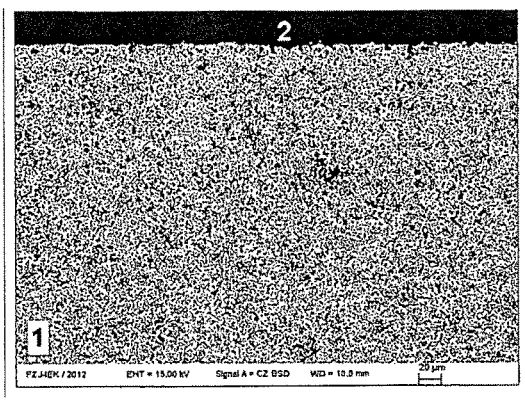
FIG. 8a shows that only a uniform porous mixed oxide phase is still recognizable in the micro structure of the storage material.
Figure 8B:
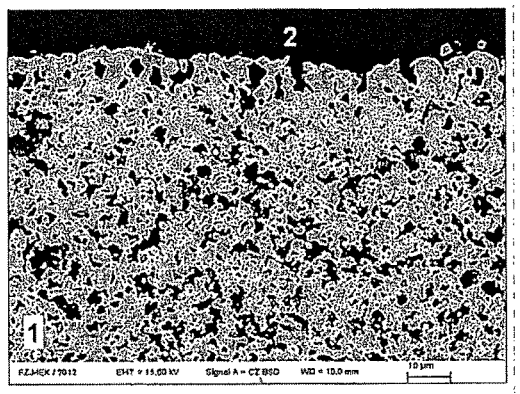
FIG. 8b shows on a different scale that only a uniform porous mixed oxide phase is still recognizable in the micro structure of the storage material.
Figure 9A:
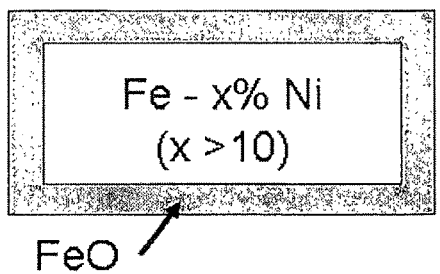
FIG. 9a shows an embodiment of the storage material.
Figure 9B:
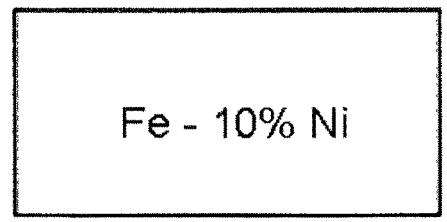
FIG. 9b shows an embodiment of the storage material.

In the case of a reactive oxidic framework structure (such as (Mg, Fe)O, as shown in FIGS. 7 and 8), the active component, e.g. iron, can leave the framework structure during the reduction of the store, due to the low chemical stability of the oxides thereof (under the given temperature and $O_2$ partial pressure conditions) and is therefore present as a metal. The oxides that have a lower decomposition pressure than FeO, which serves as the active component, e.g. MgO, then form the Fe-depleted framework structure. In the next oxidation, the active component is converted again completely, or largely, into the corresponding oxide and is integrated as such into the framework structure again, in the form of a mixed oxide or a mixed crystal.

In FIGS. 7 and 8, the reference characters mean: 1=storage material, 2=embedding mass (black) and, within the storage material, 3=active component metal (white), 4=oxidic framework structure (gray) next to pores (black). FIG. 7 shows the microstructure of the storage material at different scales after 10 cycles, wherein the last cycle was a charging cycle in this case. As is clearly apparent, the reduced metallic iron is recognizable as homogeneous light spots within the oxidic framework structure. In FIG. 8, likewise at different scales, only a uniform porous mixed oxide phase is still recognizable in the microstructure of the storage material after 11 cycles, wherein the last cycle was a discharging cycle in this case. The active component, in the oxidized form, has been completely taken up/integrated in the framework oxide by mixed oxide formation.

By means of this integration of the active component into the reactive framework, long term coarsening or permanent separation (migration) of the active component is effectively prevented, or is at least substantially slowed.

B) Second Advantageous Embodiment of the Invention Having a Storage Material Comprising an Active Component and a Reactive, Metallic Framework Structure Third Exemplary Embodiment Active Component: Fe—FeO, Framework Structure-Forming Material: Ni.

A storage material according to the invention having an iron-containing alloy is described in the following, wherein iron is the active component.

Figure 10A:
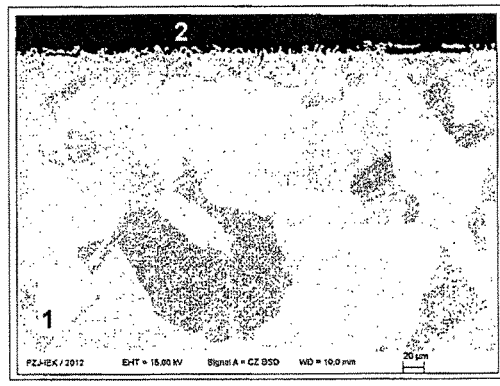
FIG. 10a shows the case of a reactive metallic framework structure.
Figure 10B:
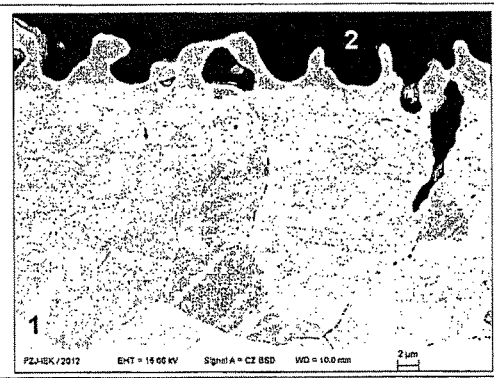
FIG. 10b shows the case of a reactive metallic framework structure.

In the case of a reactive metallic framework structure (such as an Fe—Ni alloy, as illustrated in FIGS. 10 and 11, the active component, e.g. iron, can leave the framework structure during the oxidation of the storage device due to the higher chemical stability of the oxides thereof (under the given conditions of temperature and $pO_2$ partial pressure) and is therefore present as an oxide (recognizable in FIGS. 11a and 11b). Metals with oxides that have a higher decomposition pressure (such as NiO) remain as an Fe-depleted, metallic active framework structure under these conditions. In the next reduction, the active component is converted again completely, or largely, into the metal and is integrated as such into the framework structure again in the form of an alloy or an intermetallic phase (FIGS. 10a and 10b).

In FIGS. 10 and 11, the reference characters mean: 1=storage material, 2=embedding mass (black) and within the storage material, 3=active component metal (gray). The pure metallic framework structure in FIGS. 11a and b, which shows the oxidized state (charged state) of the storage material at different scales together with the near-surface oxide layer 3, is hardly distinguishable from the discharged state, in which the reduced active component has now been completely integrated into the framework structure by alloy formation. FIG. 10 shows the microstructure of the storage material at different scales after 10 cycles, wherein the last cycle was a charging cycle in this case, while FIG. 11 shows the microstructure after 11 cycles, wherein the last cycle was a discharging cycle.

The present alloy or the powder mixture of the individual elements can be processed with any routine method in order to produce the three aforementioned structures. It is important that the finished storage material is present at the end of the production process as a metallic alloy, is mechanically stable, and has a high specific surface area. An example thereof would be a storage system, which is operated at 800° C., has an oxygen transfer rate of approximately 1.25 mg/cm$^2$ h, had a discharging time of approximately 2 h, and in which the storage material has a specific surface area of at least 180 cm$^2$/g.

The mechanical stability and the desired specific surface area are dependent on system parameters of the storage system (rechargeable battery type or design), such as, for example, the set working temperature or the charging or discharging rate, and therefore usually cannot be specified exactly.

The finished storage material according to the invention in the form of an alloy comprises at least two metallic components. A suitable combination of an active component and a metallic framework structure would be, for example, the following: iron as the active component and nickel as the metallic framework structure. Iron, as the active component, actively participates in the redox reactions during the charging and discharging process and is responsible for the energy storage and release. Nickel, as the framework structure, does not participate in the redox reactions, but rather ensures that this part of the storage material always remains metallic and retains its form.

In order to ensure this functionality between a metal as the active component and a metal as the framework structure, the decomposition pressure of the framework structure element oxide should always be greater than the oxygen partial pressure of the atmosphere during the discharging process, and therefore the metal selected for the reactive framework structure is always present in the metallic form.

Figure 12:
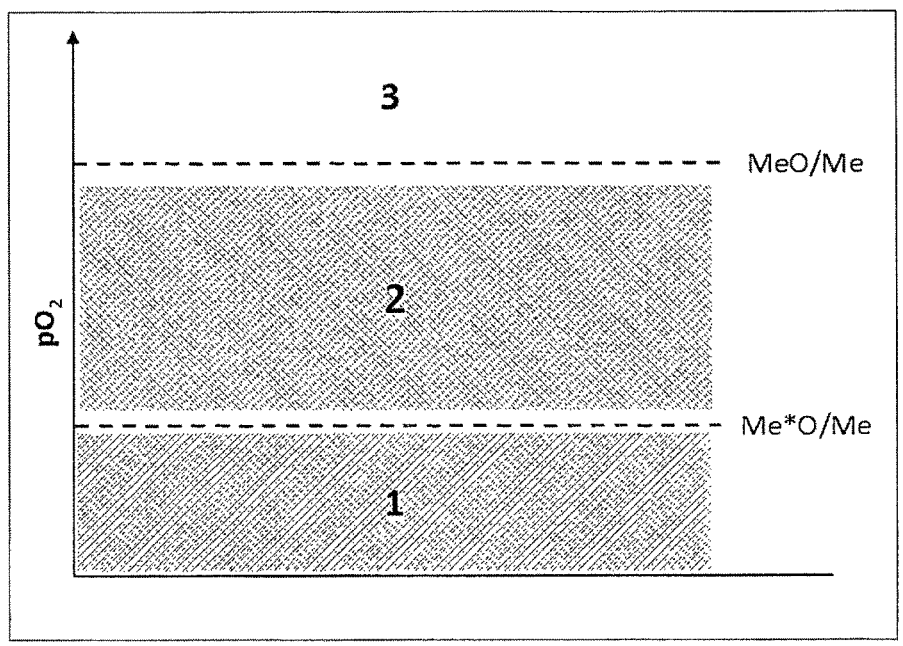
FIG. 12 schematically illustrate the stability ranges for the framework structure element (Me) and the active component (Me*).

This is also clear from FIG. 12, in which the stability ranges (1, 2, 3) for the framework structure element (Me) and the active component (Me*) are schematically illustrated as a function of the oxygen partial pressure, $pO_2$. The dashed line for MeO/Me indicates the decomposition pressure for the framework structure element oxide, which is clearly higher than the dashed line for Me*O/Me, which indicates the decomposition pressure for the active element oxide.

Based on the aforementioned example of the Fe—Ni alloy, which can be used at approximately 800° C., and based on an oxygen partial pressure during the discharging process of approximately $10^{-17}$ bar, the decomposition pressure of FeO is $10^{-19}$ bar and the decomposition pressure of NiO is $10^{-14}$ bar. In this combination and under these basic conditions, Fe functions as the active element and Ni functions as the framework structure element. Due to the decomposition pressures that are present, the formation of iron oxide from Fe takes place preferably over the oxidation of Ni to form NiO.

If nickel, for example, is intended to function as the active component (Ni*O/Ni) for another application, the framework element selected must be such that the framework structure element oxide has a decomposition pressure that is clearly higher than $10^{-14}$ bar, and here, for example, with copper, copper oxide serving as the framework structure has decomposition pressure of $10^{-10}$ bar (also see Table 3).

In addition, the storage material according to the invention, or the alloy, can also contain still further elements or additives, which, for example, improve the oxidation and/or reduction kinetics, or accelerate the diffusion of the active component in the framework structure. A suitable example of this would be: Cu>10 atom % in Fe-, Ni- and Co-based alloys. In addition, suitable additives for improving the strength (by way of, for example, Mo or W>5 at.-% in Fe-, Ni- and Co-based alloys) or the deformability, provided these do not disrupt the aforementioned modes of operation. For example, Al and/or Si additives, at concentrations above 3 atom %, have a disruptive influence.

The following Table 3 shows a few specific examples of possible variants of storage materials, according to the invention, which have a metallic framework structure, and the corresponding conditions with respect to the temperature and the oxygen partial pressure at which the framework structure advantageously has the "reactive" property thereof.

| Active component [atom percent (atom %)] | Metallic framework element | Oxygen partial pressure range* $p_{O2}$ [bar] charging | Oxygen partial pressure range* $p_{O2}$ [bar] discharging | Temperature range [° C.] |
|---|---|---|---|---|
| Fe (40-95) | Ni | $<10^{-19}$ | $>10^{-14}$ | 600-1000 |
| Fe (40-95) | Co | $<10^{-19}$ | $>10^{-16}$ | 600-1000 |
| Fe (40-95) | Ni—Co—Cu** | $<10^{-19}$ | $>10^{-16}$ | 600-1000 |
| Fe (40-95) | Ni—Co—Sn** | $<10^{-19}$ | $>10^{-16}$ | 600-1000 |
| Fe (40-95) | Ni—Cu—Sn** | $<10^{-19}$ | $>10^{-16}$ | 600-1000 |
| Fe (40-95) | Co—Cu—Sn** | $<10^{-19}$ | $>10^{-16}$ | 600-1000 |
| Co (40-90) | Cu | $<10^{-16}$ | $>10^{-10}$ | 500-1000 |
| Ni (40-90) | Cu | $<10^{-14}$ | $>10^{-10}$ | 500-1000 |
| Sn (3-20) | Cu | $<10^{-17}$ | $>10^{-10}$ | 500-750 |
| Sn (3-40) | Ni | $<10^{-17}$ | $>10^{-14}$ | 500-1000 |
| Sn (3-40) | Co | $<10^{-17}$ | $>10^{-16}$ | 500-1000 |
| Sn (0-15) | Ag | $<10^{-17}$ | $>10^{-16}$ | 500-700 |
| Sn (3-40) | Cu—Ni—Co—Ag** | $<10^{-17}$ | $>10^{-16}$ | 500-1000 |
| Mn (3-40) | Ni | $<10^{-30}$ | $>10^{-14}$ | 500-1000 |
| Mn (3-40) | Co | $<10^{-30}$ | $>10^{-16}$ | 500-1000 |
| Mn (3-50) | Fe | $<10^{-30}$ | $>10^{-19}$ | 500-1000 |
| Mn (3-50) | Ni—Co—Fe** | $<10^{-30}$ | $>10^{-19}$ | 500-1000 |
| Mn (3-30) | Ag | $<10^{-30}$ | $>10^{-19}$ | 700-900 |
| Sb (3-60) | Ni | $<10^{-19}$ | $>10^{-14}$ | 500-1000 |
| Sb (3-60) | Co | $<10^{-19}$ | $>10^{-16}$ | 500-1000 |
| Sb (3-40) | Co—Ni** | $<10^{-19}$ | $>10^{-16}$ | 500-900 |

*The listed oxygen partial pressure ranges are based on a storage system operating temperature of approximately 800° C. The values change with different temperatures and can be easily calculated for a different temperature range on the basis of known databases for thermodynamic data for oxidic systems.
**All, or only any two or three, of the metallic framework elements thus characterized can be selected. It is also possible to select any ratio between the elements, such as, for example: Fe—5% Ni; Fe—35% Ni; Fe—60% Ni; Fe—5% Co—35% Ni; Fe—2.5% Ni—2.5% Co; Fe—5% Cu—1% Ni—0.5% Co; Fe—23.7% Co—3.7% Ni—4.6% Cu.

If the operating conditions and, in particular, the oxygen partial pressure and the temperature, the mixing ratios or the microstructure, are not correctly set, degradation (material coarsening or separating) of the energy storage material cannot be permanently prevented. The microstructure can set in due to corresponding mechanical and/or thermal processing.

In the case of a reactive metallic framework structure (such as Fe-(5-50%) Ni alloy, as illustrated in FIGS. 10 and 11), the active component iron (Fe) is entirely or partially converted into an iron oxide (FeO and/or $Fe_3O_4$) during the discharging process of the storage device, wherein a framework structure (Fe, Ni alloy) depleted of iron also remains.

In the charging process, the iron oxide is reduced again and is now taken up again, as a metal, completely or largely, via diffusion into the reactive framework structure or is dissolved therein. A permanent coarsening or separation (migration) is also effectively prevented by this integration (alloy formation). In the next discharging process of the storage device, the active component can leave the reactive framework structure again and can be converted into an oxide, wherein this usually forms in the form of an oxide layer on the surface of the storage material. The integration/alloy formation mentioned here also comprises, in particular, the formation of intermetallic phases.

The invention claimed is:

1. A storage material configured for storing electrical energy by reduction or oxidation of an active component, the storage material comprising the active component in at least one form selected from a reduced form and an oxidized form, wherein the storage material further comprises a reactive framework structure configured to chemically integrate the at least one form of the active component in a form of a mixed oxide or an alloy into the reactive framework structure during a charging or discharging process, wherein the reactive framework structure is configured to form a stable mixed oxide or a stable alloy in a temperature range between 500° C. and 1000° C., wherein the reactive framework structure is a matrix of framework material that is functionable as both an inert support material, comprising only the active component, and a reactive material, actively reacting with the oxidized form or the reduced form of the active component, and further wherein an overall open porosity of the storage material is between 10 and 80% by volume.

2. A storage device for storing electrical energy, comprising at least one module, wherein the at least one module has a first electrode having a fuel chamber adjacent thereto, a second electrode having an air chamber adjacent thereto, and an oxygen-ion conducting solid electrolyte disposed between the first and second electrodes, wherein the second electrode is designed to be porous, oxygen-ion generating, and oxygen-ion conducting, wherein the fuel chamber comprises a storage material configured for storing electrical energy by reduction or oxidation of an active component, wherein the storage material comprises the active component, in at least one form selected from a reduced form and an oxidized form, and a reactive framework structure configured to chemically integrate at the at least one form of the active component in a form of a mixed oxide or an alloy into the framework structure during a charging or discharging process.

3. The storage device according to claim 2, wherein the active component comprises a metal and/or a metal oxide and/or multiple metal oxides in different levels of oxidation.

4. The storage device according to claim 2, wherein the active component comprises iron, copper, manganese, cobalt, nickel, molybdenum, antimony, tin, or tungsten.

5. The storage device according to claim 2, wherein the reactive framework structure comprises titanium, calcium, cerium, magnesium, strontium, barium, or zinc, that, during the charging or discharging process and together with at least one oxidized form of the active component, is configured to form a stable mixed oxide, that can be integrated in the reactive framework structure.

6. The storage device according to claim 5, wherein the active component includes iron and the reactive framework structure is configured to form at least one titanium-, cerium-, magnesium- or zinc-based mixed oxide with iron.

7. The storage device according to claim 2, wherein the reactive framework structure is configured to form a stable mixed oxide in a temperature range between 500° C. and 1000° C.

8. The storage device according to claim 2, wherein the reactive framework structure is configured to form a stable mixed oxide in a temperature range between 600° C. and 900° C.

9. The storage device according to claim 2, wherein the active component includes copper and the reactive framework structure is configured to form at least one titanium-, calcium-, cerium-, magnesium-, silicon- or zinc-based mixed oxide with copper.

10. The storage device according to claim 2, wherein the active component includes manganese and the reactive framework structure is configured to form at least one titanium-, calcium-, cerium-, magnesium-, strontium-, barium- or zinc-based mixed oxide with manganese.

11. The storage device according to claim 2, wherein the active component includes cobalt and the reactive framework structure is configured to form at least one titanium-, calcium-, cerium-, magnesium-, strontium-, barium- or zinc-based mixed oxide with cobalt.

12. The storage device according to claim 2, wherein the active component includes nickel and the reactive framework structure is configured to form at least one titanium-, calcium-, cerium-, magnesium-, strontium-, barium- or zinc-based mixed oxide with nickel.

13. The storage device according to claim 2, wherein the active component includes molybdenum and the reactive framework structure is configured to form at least one titanium-, calcium-, cerium-, magnesium-, strontium-, barium- or zinc-based mixed oxide with molybdenum.

14. The storage device according to claim 2, wherein the active component includes tungsten and the reactive framework structure is configured to form at least one titanium-, calcium-, cerium-, magnesium-, strontium-, barium- or zinc-based mixed oxide with tungsten.

15. The storage device according to claim 2, wherein the storage material comprises at least one of the following mixed-oxide pairs:

$TiFe_2O_5/TiFe_2O_4$, $2CaFe_2O_4/Ca_2Fe_2O_5+2Fe$, 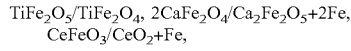
$CeFeO_3/CeO_2+Fe$, $TiFeO_3/TiO_2+Fe$, $2CaFe_5O_7/Ca_2Fe_2O_5+8Fe$, $SiFe_2O_4/SiO_2+Fe$, $TiFe_2O_4/TiFeO_3+Fe$, $MgFe_2O_4/(Mg,Fe)O+Fe$, $ZnFe_2O_4/(Zn,Fe)O+Fe$, $Fe_2CuO_4/2FeO+Cu$, $Fe_2CoO_4/2FeO+Co$, and $Fe_2NiO_4/2FeO*Ni$.

16. The storage device according to claim 2, wherein the reactive framework structure comprises nickel, cobalt, copper, iron, or silver, that, during the charging or discharging process and together with at least one reduced form of the active component, is configured to form a stable alloy, that can be integrated in the reactive framework structure.

17. The storage device according to claim 2, wherein the reactive framework structure is configured to form the metallic alloy in a temperature range between 500° C. and 1000° C.

18. The storage device according to claim 2, wherein the reactive framework structure is configured to form the metallic alloy in a temperature range between 600° C. and 900° C.

* * * * *